US012692936B2

(12) United States Patent
Dötschel et al.

(10) Patent No.: US 12,692,936 B2
(45) Date of Patent: Jul. 28, 2026

(54) COUPLING ELEMENT AND TRANSMISSION WITH COUPLING ELEMENT

(71) Applicant: ZF Friedrichshafen AG, Friedrichshafen (DE)

(72) Inventors: Philip Dötschel, Friedrichshafen (DE); Tamas Gyarmati, Bermatingen (DE); Milan Dacej, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/965,038

(22) Filed: Dec. 2, 2024

(65) Prior Publication Data

US 2025/0180111 A1     Jun. 5, 2025

(30) Foreign Application Priority Data

Dec. 4, 2023     (DE) .......................... 102023212115.8

(51) Int. Cl.
*F16H 57/04*          (2010.01)
*F16H 57/08*          (2006.01)

(52) U.S. Cl.
CPC .......... *F16H 57/08* (2013.01); *F16H 57/043* (2013.01); *F16H 57/0482* (2013.01); *F16H 57/0493* (2013.01)

(58) Field of Classification Search
CPC ..................... F16H 2003/442; F16H 2055/176
USPC ........................................................ 475/903
See application file for complete search history.

(56) References Cited

U.S. PATENT DOCUMENTS

| | | | | | |
|---|---|---|---|---|---|
| 4,459,869 | A | * | 7/1984 | Bucksch | F16H 57/0479 184/6.12 |
| 5,429,557 | A | * | 7/1995 | Beim | F16H 3/666 475/903 |
| 5,666,854 | A | * | 9/1997 | Buri | F16H 57/0031 74/439 |
| 8,206,258 | B2 | * | 6/2012 | Ziemer | F16H 55/17 475/903 |
| 8,225,688 | B2 | * | 7/2012 | Heinzelmann | F16H 3/095 74/331 |
| 8,545,364 | B2 | * | 10/2013 | Ziemer | F16H 57/08 475/903 |
| 8,613,687 | B2 | * | 12/2013 | Dopfert | F16H 57/082 475/903 |
| 8,769,819 | B2 | * | 7/2014 | Paelicke | F16H 57/08 475/903 |
| 9,423,013 | B2 | * | 8/2016 | Nitsch | F16H 37/046 |
| 9,581,208 | B2 | * | 2/2017 | Flemming | F16H 3/78 |
| 10,228,045 | B2 | * | 3/2019 | Matsumoto | F16H 1/2863 |
| 10,408,325 | B2 | * | 9/2019 | McKinzie | F16H 57/0431 |

(Continued)

FOREIGN PATENT DOCUMENTS

| | | | | | |
|---|---|---|---|---|---|
| CN | 107816531 | A | * | 3/2018 | F16H 55/17 |
| DE | 19701767 | A1 | * | 7/1998 | F16H 3/60 |

(Continued)

*Primary Examiner* — Sherry L Estremsky
(74) *Attorney, Agent, or Firm* — Dority & Manning, P.A.

(57)          ABSTRACT

A coupling element for coupling a first gearset and a second gearset of a transmission. The coupling element having an annular body, an inner circumference of the annular body defining an inner toothing, an outer circumference of the annular body defining an outer toothing, and a first end region of the annular body in an axial direction defining a recess.

14 Claims, 5 Drawing Sheets

(56)     References Cited

U.S. PATENT DOCUMENTS

| 11,149,825 B1 * | 10/2021 | Heinbuch | ............. | F16H 57/082 |
| 2019/0346025 A1 * | 11/2019 | Ziemer | .................... | F16H 3/66 |
| 2024/0336131 A1 * | 10/2024 | Führer | .................. | B60K 23/04 |

FOREIGN PATENT DOCUMENTS

| DE | 102018102499 B3 * | 4/2019 | ............. | F16D 1/116 |
| DE | 102018107207 A1 * | 10/2019 | ............. | B60K 17/08 |
| DE | 102018216062 B3 * | 1/2020 | ............. | F16H 57/08 |
| WO | WO2005120877 A1 | 12/2005 | | |

* cited by examiner

COUPLING ELEMENT AND TRANSMISSION WITH COUPLING ELEMENT

CROSS-REFERENCE TO RELATED APPLICATION

The present application is related and has right of priority to German Patent Application No. 10 2023 212 115.8 filed on Dec. 4, 2023, the entirety of which is incorporated by reference for all purposes.

FIELD OF THE INVENTION

The present invention relates generally to a coupling element, and generally to a transmission with coupling element.

BACKGROUND

A coupling element is shown in WO 2005/120877 A1. The coupling element serves for the mechanical coupling of a first planetary gearset to a second planetary gearset. The coupling element has, at an inner circumference, a ring gear which is in engagement with a planet gear lying on the inside in a radial direction.

SUMMARY OF THE INVENTION

It is an object of the present invention to provide an improved coupling element which increases the efficiency and the lubricating function of the transmission during operation.

A coupling element defines an inner toothing, an outer toothing, and a recess. The coupling element is configured in an annular manner. The inner toothing is formed at an inner circumference of the coupling element. The outer toothing is formed at an outer circumference of the coupling element. Therefore, the inner toothing is torque-proofly connected to the outer toothing. At least one recess is formed at at least one first end region in an axial direction. The first end region may be at the inner toothing. At least one recess may be defined at a second end region opposite the first end region in the axial direction. The second end region may be at the inner toothing.

If two elements are coupled to one another, a movement of the one element causes a reaction of the other element. For example, a connection may be a form-fit or friction-fit connection. Further elements may be provided between the elements. For example, a connection may be torque-proof. A torque-proof connection of two elements is understood to mean a connection in which the two elements are rigidly coupled to one another in all intended states, for example of a transmission, so that they have substantially the same rotational speed. In this case, the elements may be present as individual components torque-proofly connected to one another or else in one piece.

In an embodiment, the coupling element may define a circumferential groove which is formed at the inner circumference of the coupling element. The groove may be at the first end region of the coupling element.

The recess may overlap a groove base of the groove in a radial direction. The groove base may be the outer cylindrical surface of the groove in the radial direction. The recess may extend from the groove base at least partially in the radial direction. Thus, the recess may form at least one small step in the radial direction outward from the groove base. Two grooves may be present. Each groove may be arranged in each case at one of the two end regions of the coupling element opposite one another in the axial direction.

In an embodiment, the recess may extend from the groove in the radial direction through the coupling element up to an outer side of the coupling element.

In an embodiment, the recess may extend from the groove in the axial direction through the coupling element up to an outer side of the coupling element. The recess may extend obliquely, that is to say in the radial direction and in the axial direction, through the coupling element up to the outer side of the coupling element.

In an embodiment, the recess may be defined by a through hole. The bore may originate in the groove base. The bore may extend obliquely, that is to say in the radial direction and in the axial direction, through the coupling element up to the outer side of the coupling element. The diameter of the bore may be smaller than the width of the groove.

In an embodiment, the recess may be defined by a surface curved outwardly in the radial direction. The curved surface may be a cylindrical surface. The curved surface may extend in the radial direction from the inner circumference of the coupling element to beyond the groove base. The curved surface may be defined by a portion of a bore. The bore may be produced by drilling or face milling in the axial direction. The center point of the bore may be arranged within the inner circumference of the coupling element in the radial direction.

In an embodiment, the recess may have a rectangular cross section in the circumferential direction. The recess may be produced by a face milling cutter moved in the radial direction and aligned in the axial direction. The recess may completely cover the groove in the axial direction. The recess may completely cover the groove in the radial direction.

In an embodiment, a plurality of recesses may be provided. The recesses may be uniformly distributed in the circumferential direction. An even number of recesses may be provided at each of the end regions of the coupling element. More than three, for example eight, recesses may be provided at each of the end regions of the coupling element. If recesses are provided at each of the two end regions of the coupling element, then the same number of recesses may be provided at each of the end regions, and the recesses of the two end regions may be provided at the same position in the circumferential direction.

In an embodiment, at least one of the outer toothing and the inner toothing may be helically toothed. Both the outer toothing and the inner toothing may be helically toothed.

In an embodiment, an oil space may be defined at the inner circumference of the coupling element. The oil space may be delimited in the axial direction by a delimiting surface. The delimiting surface may extend in the circumferential direction. A delimiting surface may be arranged in the axial direction at the end region of the inner toothing. The oil space may include the toothing of the first ring gear.

The groove may at least partially define the delimiting surface. For example, a surface of the groove which is located on the outside in the axial direction may form the delimiting surface. The oil space may extend between two grooves. The oil space may be formed between the groove base and the surfaces of the groove extending in the circumferential direction. During the intended use of the coupling element, a centrifugal force may act in the radial direction, which conveys oil in the radial direction for lubricating the first ring gear.

The oil space may be delimited by a second delimiting surface. The second delimiting surface may be provided at a second end region opposite the first end region. The second delimiting surface may be formed at least partially by a second groove. The oil space may extend inwardly in the axial direction to the center of the coupling element. The oil space may be arranged in the axial direction between two delimiting surfaces. The oil space may be delimited in each case by the groove base of the grooves, the surface of the grooves located on the outside in the axial direction and the inner circumference of the coupling element.

In an embodiment, the oil space may be in fluid communication with at least one recess. The recess may be configured such that it enables an oil flow from the oil space in the radial direction of the coupling element. The oil flow may take place in the radial direction and in the axial direction from the oil space. The recess may extend from the oil space in the radial direction of the coupling element.

If two elements are fluidically connected to one another, a fluid, for example oil, may be conducted from the one element to the other element. In this case, the fluid connection may be configured to be leakage-free, so that the oil is conducted substantially completely from the one element to the other element.

One of the recesses may be configured such that it has a fluid communication with that surface of the oil space, which lies furthest at the outside in the radial direction. The recess may be in fluid communication with the groove base. This improves a discharge of oil from the oil space by centrifugal force.

One of the recesses may extend in the axial direction from the outer side of the coupling element to beyond the delimiting surface. The recess may be defined such that it does not have an undercut in the radial direction. This promotes a discharge of oil from the oil space by centrifugal force.

In an embodiment, the coupling element may be configured for coupling a first gearset and a second gearset of a transmission. The first gearset may have at least a first ring gear. The second gearset may have at least a second spur gear. The coupling element may form the first ring gear at an inner circumference and the second spur gear at an outer circumference.

In an embodiment, the coupling element may have a securing element which is configured to at least indirectly relative position the coupling element and at least one first planet gear of the first gearset in the axial direction. The first planet gear may be in engagement with the first ring gear. A surface of the securing element, which is located on the inside in the axial direction, may at least partially form the delimiting surface of the oil space. The recess may extend in the axial direction from the outer side of the coupling element to beyond the surface of the securing element, which is located on the inside in the axial direction. The securing element may be a snap ring or securing ring. The circumferential groove may be configured for positioning the securing element in the axial direction.

In an embodiment, a thrust washer may be provided between the coupling element and the first planet gear for relative positioning of the coupling element and the first planet gear. The thrust washer may contact the surface of the securing element which is located on the inside. The thrust washer may be configured for axial positioning of the first planet gear. A surface of the thrust washer, which is located on the inside in the axial direction, may at least partially form the delimiting surface of the oil space. The surface of the thrust washer, which is located on the inside, may be configured in a convex manner towards the inside in the axial direction. A line contact may occur when the thrust washer makes contact with the first planet gear.

The recess may extend in the axial direction from the outer side of the coupling element to beyond the surface of the thrust washer, which is located on the inside in the axial direction. The thrust washer and securing ring may be a one-piece element.

In one aspect, the present invention relates to a transmission with a first gearset, a second gearset, and a coupling element according to one of the preceding embodiments. The first gearset has the first ring gear. The second gearset has the second spur gear.

In an embodiment, the first gearset may be a first planetary gearset which may have a first sun gear, a first planet carrier, a first planet gear, and the first ring gear. The first planet gear may form a first spur gear. The first sun gear may be in engagement with the first planet gear.

In an embodiment, the second gearset may be a second planetary gearset. The second planetary gearset may have a second sun gear, a second planet carrier, a second planet gear, and a second ring gear. The second sun gear may form the second spur gear. The coupling element then forms a sun ring gear. The second sun gear may be in engagement with the second planet gear. The second planet gear may be in engagement with the second ring gear. The first planetary gearset and the second planetary gearset may be arranged in the same plane in the axial direction. The first planetary gearset and the second planetary gearset may be arranged offset with respect to one another in the axial direction.

The transmission may have the function of a differential gear.

DETAILED DESCRIPTION

Figure 1:
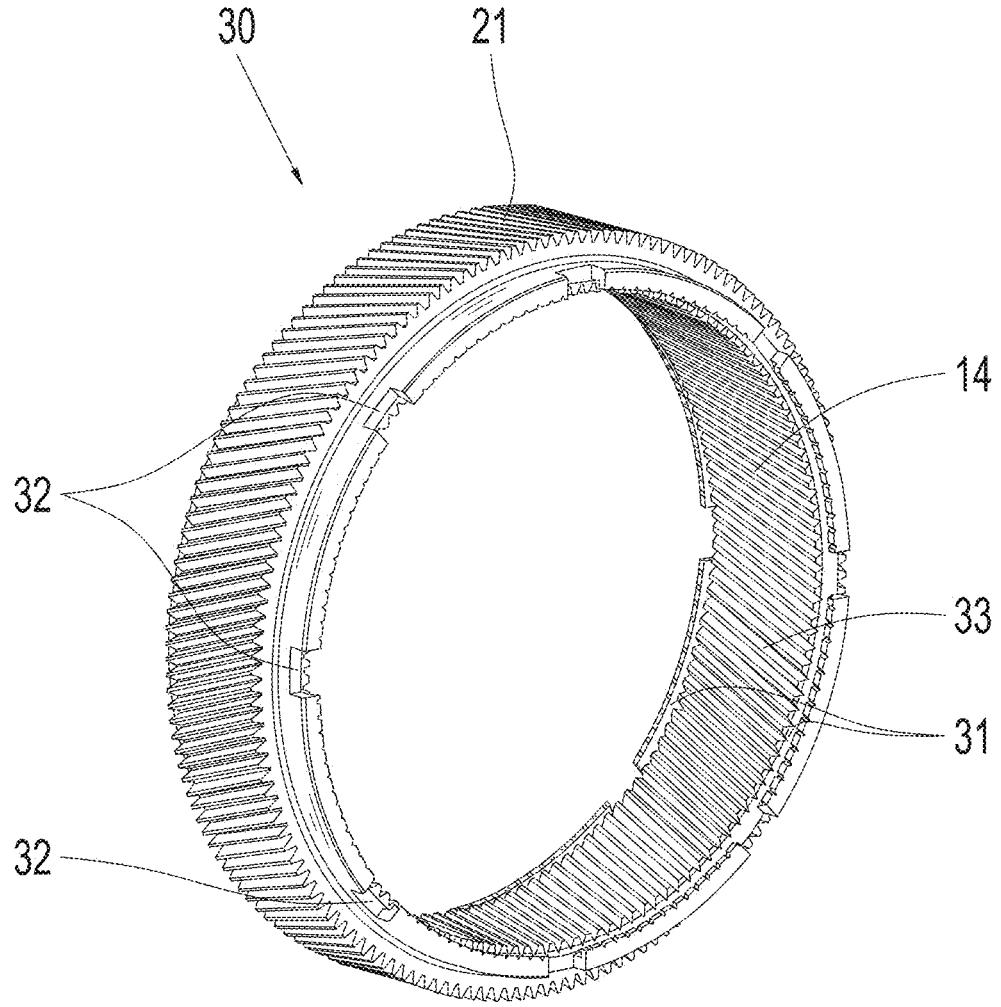
FIG. 1 shows a perspective view of an embodiment of the coupling element.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of an embodiment of a coupling element 30. The coupling element 30 is annular. The coupling element 30 forms an inner toothing at an inner circumference, in the present case a first ring gear 14 of a first gearset. The first ring gear 14 is configured to come into engagement with a first planet gear, which is not shown in FIG. 1. The coupling element 30 forms an outer toothing at an outer circumference, in the present case a second spur gear, as a second sun gear 21 of a second gearset. The first ring gear 14 and the second spur gear are helically toothed, wherein the teeth of the first ring gear 14 and of the second spur gear are set obliquely in the same direction with respect to a circumferential direction of the coupling element 30.

In its intended use, the first ring gear 14 is lubricated and cooled by oil. A circumferential groove 31 is defined in each opposite end region of the inner circumference of the coupling element 30 in an axial direction. The coupling element 30 thus has two circumferential grooves 31. Each of the two circumferential grooves 31 is configured for receiving a securing ring. The grooves 31 each have a surface, which is located at the outside in the axial direction, extends in the circumferential direction and respectively forms a delimiting surface for an oil space 33. In the intended use of the coupling element 30, the oil is conveyed to the oil space 33 by centrifugal force or in another way.

Eight recesses 32 are defined at each end region. Each of the recesses 32 has a rectangular cross section. Each of the recesses 32 extends in the axial direction respectively from an inner surface, which extends in the circumferential direction, to the outside of the coupling element 30 up to an outer side of the coupling element 30. Each of the recesses 32 extends in a radial direction from the groove base of the groove 31 to the outside of the coupling element 30 up to the outer side. In other words, each of the recesses 32 completely overlaps the groove 31 both in the axial direction as well as in the radial direction. Each of the recesses 32 is configured such that the oil may flow out of the oil space 33 to the outer side.

Figure 2:
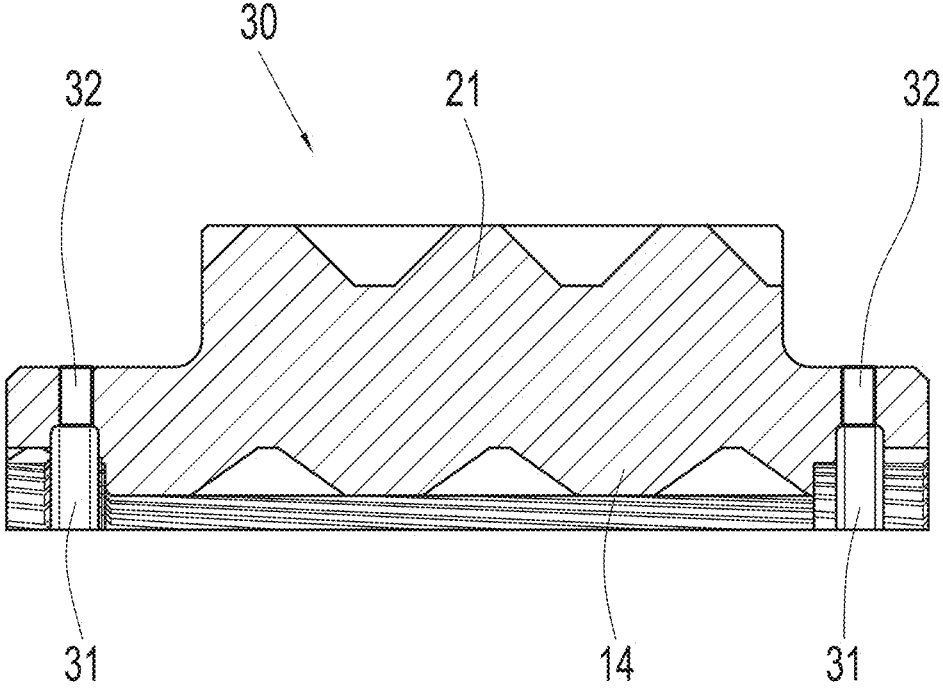
FIG. 2 shows a sectional view of a further embodiment of the coupling element.

FIG. 2 shows a sectional view of a further embodiment of the coupling element 30. In the present embodiment, the configuration of the recesses 32 differs from the recesses 32 described with respect to FIG. 1.

In the present case, one of the recesses 32 is defined by a cylindrical bore. The cylindrical bore extends in the radial direction from the groove base up to the outer side. The diameter of the cylindrical bore is smaller than the width of one of the grooves 31. The cylindrical bore is positioned within one of the grooves 31 in the axial direction.

Figure 3:
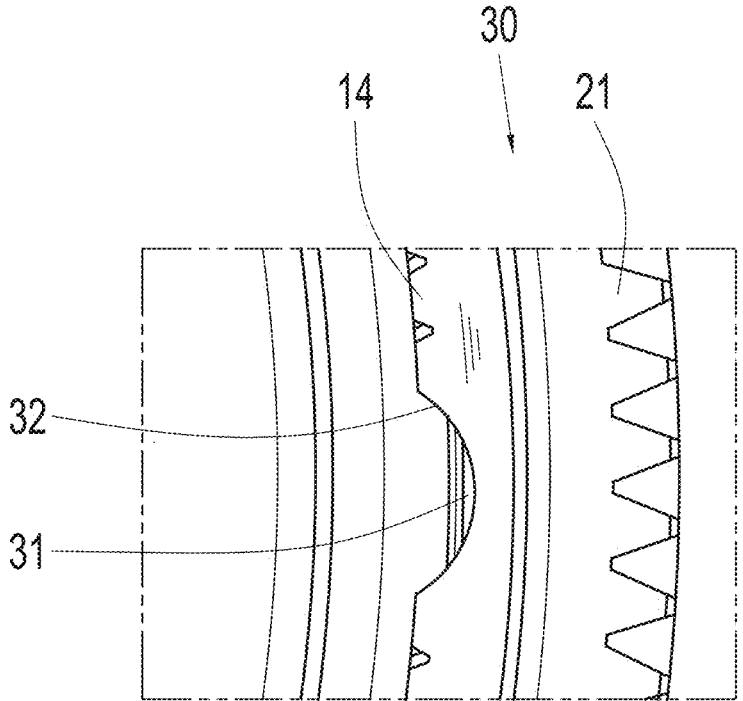
FIG. 3 shows a side view of a further embodiment of the coupling element.

FIG. 3 shows a side view of a further embodiment of the coupling element 30. In the present embodiment, the configuration of the recesses 32 differs from the recesses 32 described with respect to FIG. 1.

In the present case, one of the recesses 32 is defined by a surface, which extends in the axial direction and curves outwardly in the radial direction. The curved surface extends in the radial direction from the inner side of the coupling element 30 to beyond the groove base of respectively one of the grooves 31. The curved surface extends in the axial direction from the groove base up to the outer side of the coupling element 30.

Figure 4:
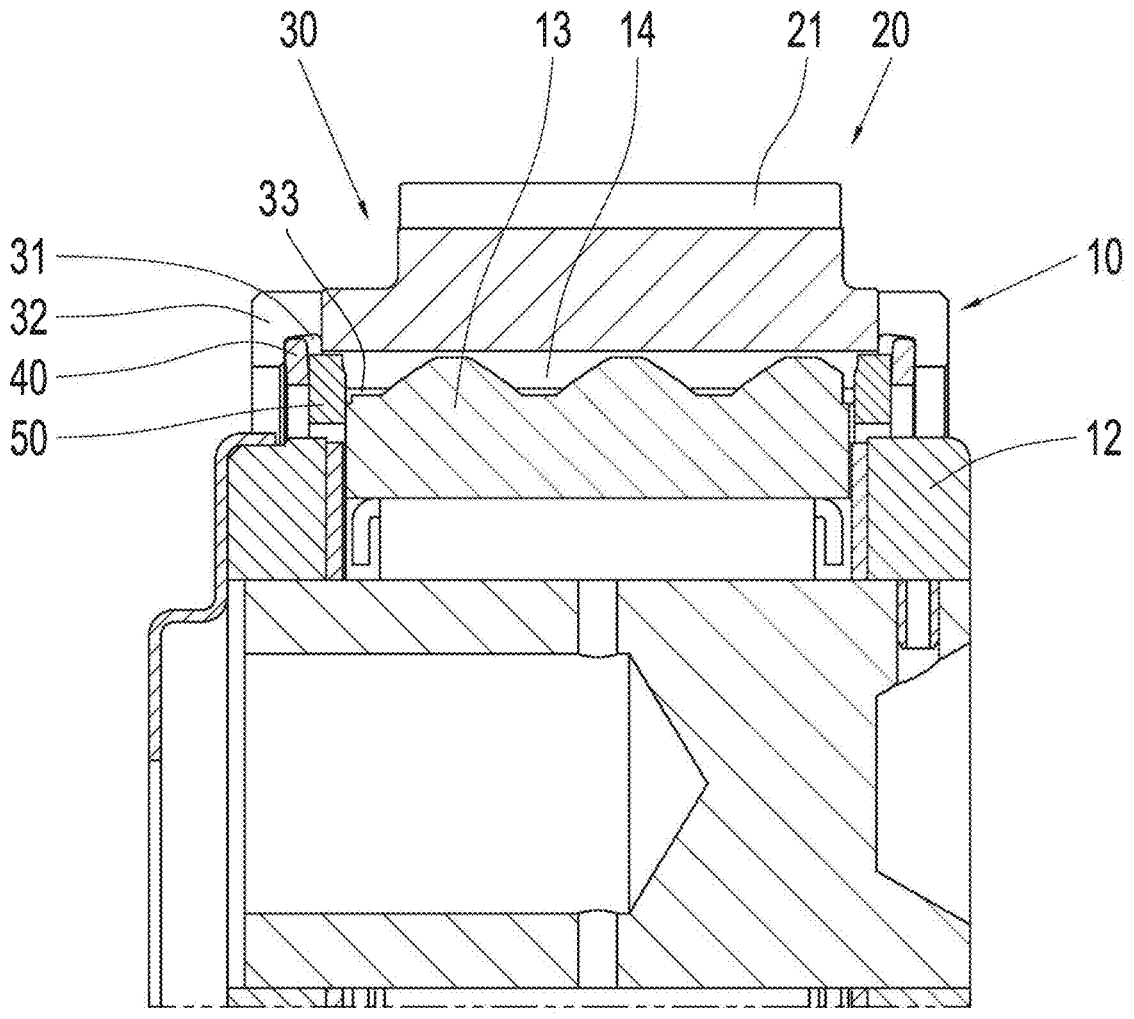
FIG. 4 shows a sectional view of an embodiment of a transmission with the coupling element.

FIG. 4 shows a sectional view of an embodiment of a transmission with the coupling element 30 as described with respect to FIG. 1. The transmission has a first planetary gearset 10 and a second planetary gearset 20. The first planetary gearset 10 has a first planet carrier 12, a number of first planet gears 13 and the first ring gear 14. The first planet gears 13 are rotatably supported in the first planet carrier 12. The second planetary gearset 20 has a second sun gear 21. The second sun gear 21 is the second spur gear. Therefore, the coupling element 30 is a sun ring gear which forms the first ring gear 14 at its inner circumference and the second sun gear 21 at its outer circumference.

In each of the grooves 31, a securing element 40, as a securing ring, is respectively arranged. Between one of the securing elements 40 and one of the first planet gears 13, a thrust washer 50 is respectively arranged on both sides of the first planet gears 13 in the axial direction. When the coupling element 30 is used as intended, at least one of the first planet gears 13 abuts against at least one of the thrust washers 50.

As a result, the first planet gears 13 are positioned within the first ring gear 14 in the axial direction.

A surface of each securing element 40, which is located on the inside in the axial direction and extends in the circumferential direction, at least partially defines the delimiting surface of the oil space 33. A surface of each thrust washer 50, which is located on the inside in the axial direction and extends in the circumferential direction, at least partially defines the delimiting surface of the oil space 33. In particular, the oil space 33 is delimited by the inner circumference of the coupling element 30, in each case the groove base of the grooves 31, the surfaces of the securing elements 40, which are located on the inside in the axial direction, and the surfaces of the thrust washers 50, which are located on the inside in the axial direction.

The oil in the oil space 33 between the thrust washer 50 and the inner circumference of the coupling element 30 is conveyed, in each case, into one of the grooves 31 by centrifugal force. The oil may flow out of each of the grooves 31 through the recesses 32 to the outer side.

In alternative embodiments, in each case one of the recesses 32 is configured as described with respect to FIGS. 2 and 3.

Figure 5:
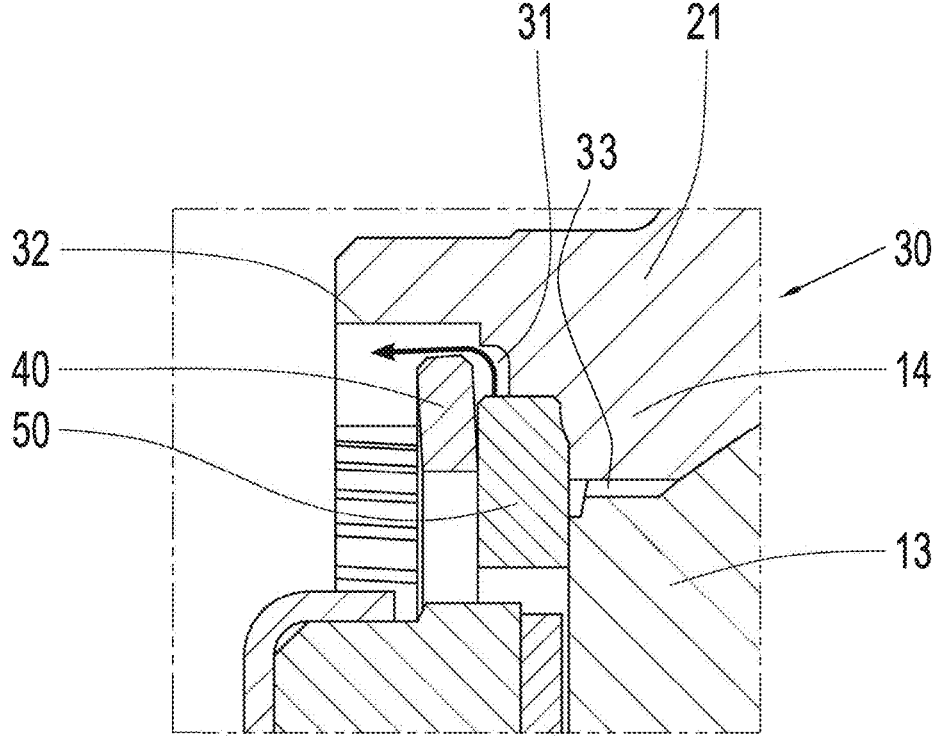
FIG. 5 shows in detail a sectional view of an embodiment of the transmission with the coupling element.

FIG. 5 shows in detail a sectional view of an embodiment of the transmission with the coupling element 30 as described with respect to FIG. 3. Otherwise, the present embodiment has all the features of the embodiment described with respect to FIG. 4. The arcuate surface of one of the recesses 32 ends within the coupling element 30 in the axial direction in a region between the surface of one of the securing elements 40, which is located on the inside in the axial direction, and the surface of one of the grooves 31, which is located on the inside in the axial direction.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

10 first planetary gearset
12 first planet carrier of the first planetary gearset
13 first planet gear of the first planetary gearset
14 first ring gear of the first planetary gearset
20 second planetary gearset
21 second sun gear of the second planetary gearset
30 coupling element
31 groove
32 recess
33 oil space
40 securing element
50 thrust washer

The invention claimed is:

1. A coupling element (30), the coupling element (30) comprising:

an annular body, an inner circumference of the annular body defining an inner toothing, an outer circumference of the annular body defining an outer toothing, a first end region of the annular body in an axial direction defining a recess (32), wherein the inner circumference of the annular body at the first end region defines a circumferential groove (31), wherein an oil space (33) is defined at the inner circumference of the annular body, the oil space (33) being delimited in the axial direction by a delimiting surface, the circumferential groove (31) at least partially defining the delimiting surface, and wherein the oil space (33) is in fluid communication with the recess (32), the recess (32) enabling an oil flow from the oil space (33) in a radial direction.

2. The coupling element (30) of claim 1, wherein the recess (32) is defined through the annular body in a radial direction from the circumferential groove (31) to an outer side of the annular body.

3. The coupling element (30) of claim 1, wherein the recess (32) is defined through the annular body in the axial direction from the circumferential groove (31) to an outer side of the annular body.

4. The coupling element (30) of claim 1, wherein the recess (32) is defined by a through hole in the annular body.

5. The coupling element (30) of claim 1, wherein the recess (32) is defined by a surface curved outwardly in a radial direction.

6. The coupling element (30) of claim 1, wherein the recess (32) is rectangular in a circumferential direction.

7. The coupling element (30) of claim 1, wherein the recess (32) is one of a plurality of recesses (32).

8. The coupling element (30) of claim 1, wherein one or both of the inner toothing or the outer toothing is helically toothed.

9. The coupling element (30) of claim 1, wherein the annular body is configured to couple a first gearset and a second gearset of a transmission, the first gearset comprises a first ring gear (14), the second gearset comprises a second spur gear, the first ring gear (14) being defined by the inner circumference of the annular body and the second spur gear being defined by the outer circumference of the annular body.

10. The coupling element (30) of claim 9, further comprising a securing element (40), the securing element (40) being configured to at least indirectly position at least one first planet gear (13) of the first gearset relative to the annular body in the axial direction, wherein a surface of the securing element (40) at least partially defines the delimiting surface of the oil space (33), the surface of the securing element (40) facing an inside of the annular body in the axial direction.

11. The coupling element (30) of claim 10, further comprising a thrust washer (50), the thrust washer (50) being configured to be between the annular body and the first planet gear (13) for positioning the first planet gear (13) relative to the annular body, wherein a surface of the thrust washer (50) at least partially defines the delimiting surface of the oil space (33), the surface of the thrust washer (50) facing the inside of the annular body in the axial direction.

12. A transmission, comprising:

the coupling element (30) of claim 1;

a first gearset, the first gearset comprising a first ring gear (14), the first ring gear (14) being defined by the inner circumference of the annular body; and a second gearset, the second gearset comprising a second spur gear, the second spur gear being defined by the outer circumference of the annular body.

13. The transmission of claim 12, wherein the first gearset is a first planetary gearset (10), the first planetary gearset (10) comprising a first sun gear, a first planet carrier (12), a first planet gear (13), and the first ring gear (14), the first sun gear being in engagement with the first planet gear (13).

14. The transmission according to claim 12, wherein the second gearset is a second planetary gearset (20), the second planetary gearset (20) comprising second sun gear (21), a second planet carrier, a second planet gear, and a second ring gear, the second sun gear (21) being the second spur gear, the second sun gear (21) being in engagement with the second planet gear, the second planet gear being in engagement with the second ring gear.

* * * * *